US012772202B2

(12) United States Patent
Kucera et al.

(10) Patent No.: US 12,772,202 B2
(45) Date of Patent: Oct. 20, 2026

(54) CONFIGURATION OF DYNAMICALLY TRIGGERED SL PRS TRANSMISSIONS

(71) Applicant: Nokia Technologies Oy, Espoo (FI)

(72) Inventors: Stepan Kucera, Munich (DE); Prajwal Keshavamurthy, Munich (DE)

(73) Assignee: Nokia Technologies Oy, Espoo (FI)

( * ) Notice: Subject to any disclaimer, the term of this patent is extended or adjusted under 35 U.S.C. 154(b) by 238 days.

(21) Appl. No.: 18/798,831

(22) Filed: Aug. 9, 2024

(65) Prior Publication Data

US 2025/0056484 A1 Feb. 13, 2025

Related U.S. Application Data

(60) Provisional application No. 63/532,125, filed on Aug. 11, 2023.

(51) Int. Cl.

| | |
|---|---|
| ***H04W 64/00*** | (2009.01) |
| ***H04L 5/00*** | (2006.01) |
| *H04W 92/18* | (2009.01) |

(52) U.S. Cl.

CPC .......... *H04W 64/00* (2013.01); *H04L 5/0051* (2013.01); *H04W 92/18* (2013.01)

(58) Field of Classification Search

USPC ............................................. 455/456.1-457

See application file for complete search history.

(56) References Cited

U.S. PATENT DOCUMENTS

2021/0410103 A1* 12/2021 Zhang .................. H04L 5/0048

OTHER PUBLICATIONS

"Revised SID on Study on expanded and improved NR positioning", 3GPP TSG RAN Meeting #94e, RP-213588, Intel, Agenda item: 8.6.1, Dec. 6-17, 2021, 5 pages.

"New WID on Expanded and Improved NR Positioning", 3GPP TSG RAN Meeting #98-e, RP-223549, Intel Corporation, Agenda item: 9.1.1, Dec. 12-16, 2022, pp. 1-7.

"3rd Generation Partnership Project; Technical Specification Group Radio Access Network; Study on expanded and improved NR positioning; (Release 18)", 3GPP TR 38.859 V18.0.0, Dec. 2022, pp. 1-238.

"3rd Generation Partnership Project, Technical Specification Group Services and System Aspects; Service requirements for the 5G system; Stage 1 (Release 19)", 3GPP TS 22.261 V19.3.0, Jun. 2023, 121 pages.

"3rd Generation Partnership Project; Technical Specification Group Services and System Aspects; Service requirements for cyber-physical control applications in vertical domains; Stage 1 (Release 19)", 3GPP TS 22.104 V19.0.0, Mar. 2023, pp. 1-104.

(Continued)

*Primary Examiner* — Suhail Khan

(74) *Attorney, Agent, or Firm* — Barta Jones, PLLC

(57) ABSTRACT

Embodiments of the invention provide for: receiving, from a user equipment, a request for a transmission of a response sidelink positioning reference signal; receiving, from the user equipment, an initial sidelink positioning reference signal; determining a configuration of the response sidelink positioning reference signal, at least partially based on a configuration of the initial sidelink positioning reference signal; and transmitting, to the user equipment, the response sidelink positioning reference signal.

20 Claims, 8 Drawing Sheets

(56) References Cited

OTHER PUBLICATIONS

"3rd Generation Partnership Project; Technical Specification Group Radio Access Network; Study on scenarios and requirements of in-coverage, partial coverage, and out-of-coverage NR positioning use cases (Release 17)", 3GPP TR 38.845 V17.0.0, Sep. 2021, pp. 1-16.

"LS reply to 3GPP RAN on requirements of in-coverage, partial coverage, and out-ofcoverage positioning use cases", 3GPP TSG RAN Meeting #91e, RP-210040, 5GAA, Mar. 16-26, 2021, pp. 1-5.

"3rd Generation Partnership Project; Technical Specification Group Radio Access Network; NR; Sidelink Positioning Protocol (SLPP); Protocol specification (Release 18)", 3GPP TS 38.355 V0.0.3, May 2023, pp. 1-14.

"3rd Generation Partnership Project; Technical Specification Group Radio Access Network; LTE Positioning Protocol (LPP) (Release 17)" , 3GPP TS 37.355 V17.5.0, Jun. 2023, pp. 1-350.

* cited by examiner

CONFIGURATION OF DYNAMICALLY TRIGGERED SL PRS TRANSMISSIONS

TECHNICAL FIELD

The examples and non-limiting example embodiments relate generally to communications and, more particularly, to configuration of a sidelink positioning reference signal (SL PRS) when the transmission of the SL PRS is dynamically triggered by lower layer signaling.

BACKGROUND

It is known to estimate the position of a communication device in a communication network.

BRIEF DESCRIPTION OF THE DRAWINGS

The foregoing aspects and other features are explained in the following description, taken in connection with the accompanying drawings.

DETAILED DESCRIPTION OF EXAMPLE EMBODIMENTS

Figure 1:
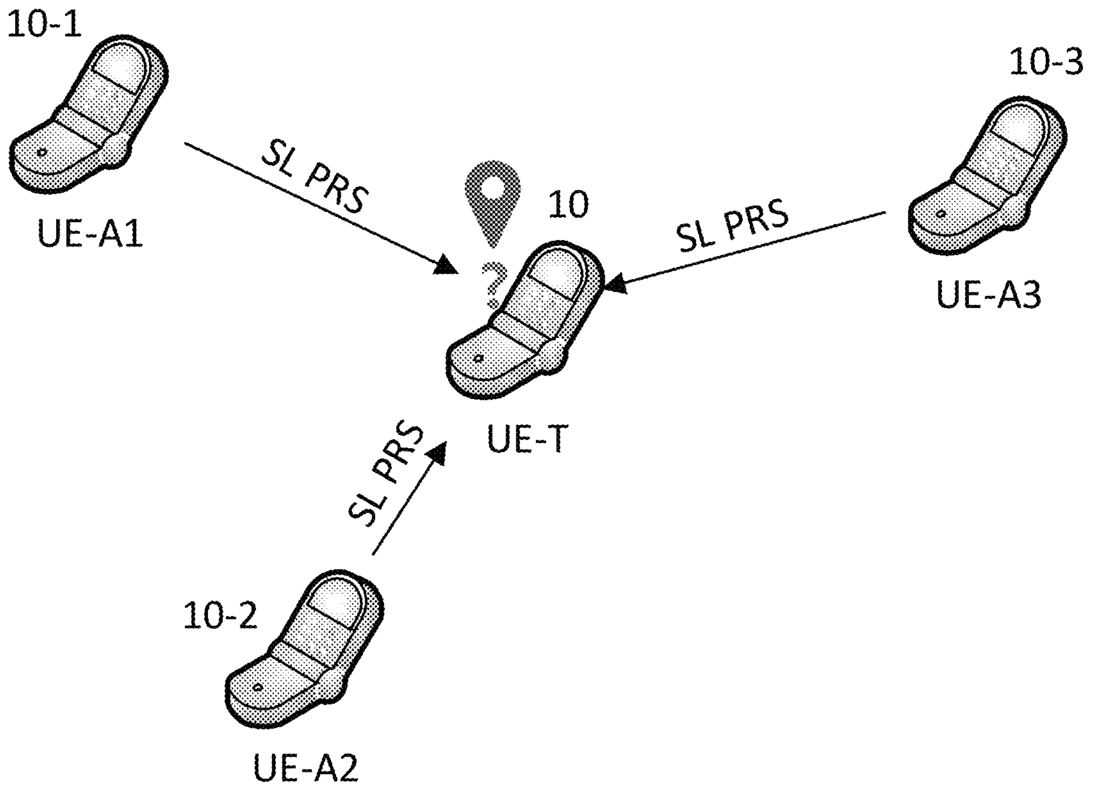
FIG. 1 is an illustration of a SL positioning scenario.

The methods described herein address an open problem in sidelink (SL) positioning in 5G New Radio (NR), in particular on question how to select the SL PRS configuration when the SL PRS request is triggered by lower layer (e.g. via SCI or SL PRS).

Use Cases and Requirements

Prior to this, 3GPP RAN conducted a study on "Scenarios and requirements of in-coverage, partial coverage, and out-of-coverage NR positioning use cases" in Release-17 focused on V2X and public safety use cases with the outcome being captured in TR38.845. Additionally, SAI has developed requirements in TS22.261 for "Ranging based services", and has developed positioning accuracy requirements in TS22.104 for IIoT use cases in out-of-coverage scenarios.

In Table 7.3.2.2-1, TS22.261 lists the performance requirements for different positioning service levels. It is noted that, along with horizontal and vertical accuracy requirements, the requirements on positioning service availability and positioning service latency are particularly very stringent for positioning service levels 4 (99.9% availability and 15 ms latency) and 6 (99.9% availability and 10 ms latency). The examples of scenarios/use cases of positioning service levels 4 and 6 include (1-2):

1. V2X, set-2 and set-3 use cases [TR38.845]: This corresponds to, in RP-210040, 'Group 2: Lane level positioning requirement' use cases such as vehicle platooning, cooperative lane merge, lane change warning, emergency break warning, intersection movement assist, etc., and 'Group 3: Below meter positioning requirement' use cases such as high definition sensor sharing, vulnerable road user (VUR)—collision risk warning, cooperative manoeuvers in emergency situations, real-time situation awareness and high-definition maps, etc.

2. IIoT [TS22.104]: Factories of the Future scenarios such as augmented reality in smart factories, mobile control panels with safety functions in smart factories (within factory danger zones), inbound logistics for manufacturing (for driving trajectories (if supported by further sensors like camera, GNSS, IMU) of indoor autonomous driving systems)).

SL Positioning Overview

The following is a list of related terminologies [TR 38.859].

Target UE: UE to be positioned (in this context, using SL, i.e., PC5 interface).

Anchor UE: UE supporting positioning of target UE, e.g., by transmitting and/or receiving reference signals for positioning, providing positioning-related information, etc., over the SL interface.

Sidelink positioning: Positioning UE using reference signals transmitted over SL, i.e., PC5 interface, to obtain absolute position, relative position, or ranging information.

Ranging: Determination of the distance and/or the direction between a UE and another entity, e.g., anchor UE.

Sidelink positioning reference signal (SL PRS): Reference signal transmitted over SL for positioning purposes.

SL PRS (pre-)configuration: (Pre-)configured parameters of SL PRS such as time-frequency resources (other parameters are not precluded) including its bandwidth and periodicity.

SL positioning is based on the transmissions of SL PRS by multiple anchor UEs to be received by a target UE in e.g. SL TDOA methods or SL PRS exchange between the anchor(s) and target UEs in e.g. SL (multi-) RTT method to enable localization of the target UE and/or ranging of target UE with respect to a reference UE (e.g. anchor UE) within precise latency and accuracy requirements of the corresponding SL positioning. FIG. 1 illustrates a SL positioning scenario where a target UE (UE-T 10) is performing SL positioning by receiving SL PRS from three anchor UEs (UE-A1 10-1, UE-A2 10-2 and UE-A3 10-3) and determining its location using SL TDOA method. Here, the anchors are said to provide SL PRS assistance (including SL PRS) to the target UE.

A UE can trigger another UE via SCI for SL PRS transmission. The examples described herein address several open problems, including regarding the triggering of SL-PRS, supporting UE-A to request UE-B to transmit SL-PRS via lower layer signaling sent by UE-A, confirming the related WA for shared and dedicated resource pools, and regarding the lower-layer signaling, supporting SCI associated with SL-PRS transmission.

SL positioning is based on the SL-PRS exchange between an initiator UE (e.g. target UE) and responding UE (e.g. anchor UE) in RTT-based methods. Here, a SL PRS transmission at a responding UE (e.g. anchor UE in first stage of SL RTT) can be triggered by the initiator UE (e.g. target UE in first stage of SL RTT) to have PRS exchange between the UEs. Note that RANI has agreed that the SL PRS transmission at a UE can be triggered by either its own higher layer (including higher layer request from the initiator UE) or it can be trigger from lower layer signaling (e.g. SCI) from another UE (e.g. initiator UE).

SL PRS configuration (bandwidth, frequency offset, comb, etc.) is key factor that directly impacts the achievable positioning performance. In scenarios particularly where lower layer signaling-based triggering of SL PRS transmission is employed, the responding UE may not be aware of the desired SL PRS configuration to support the positioning at initiator UE. Because the lower layer trigger signaling (e.g. SCI or SL PRS) may not contain sufficient information on the desired configuration. So, in case of lower layer-based SL PRS transmission triggering, how a responding UE selects a SL PRS configuration that is most suitable for positioning needs of the initiator UE is a key open question. The IR addresses this open question.

The examples described herein are based on the observation that if a given SL PRS transmission is used as part of a SL RTT positioning method, then any subsequent SL PRS transmission must exhibit the same or better key parameters in order not to degrade the achievable accuracy of the entire positioning process.

Among the key SL PRS parameters that determine the overall SL positioning accuracy are primarily the SL PRS bandwidth and time span (i.e. number of used symbols) as well as any other parameters determining the SL PRS S(I)NR (e.g., comb pattern, number of repetitions).

The examples described herein therefore generally are based on that in case an SL PRS "response" transmission (e.g. from anchor UE to target UE) is needed upon the reception of an "initial" SL PRS transmission (from target UE to anchor UE), for example as part of a SL RTT positioning method and/or due to the lower layer-based (SCI-based, SL PRS-based) SL PRS transmission trigger, the "response" SL PRS transmission is configured by using the same (or even better) configuration parameters of the "initial" transmission indicated in the associated SCI transmission. The term "better" is to be understood in the sense of improving achievable accuracy, i.e. in terms of better bandwidth and S(I)NR.

In addition, the method described herein specifically address different operational scenarios, including no "response" SL PRS is pre-configured—here, the so-called "PRS mirroring" concept is used, and one or more "response" SL PRSs are configured but not mapped with a particular "initial" SL PRS-here, the so-called "PRS matching" concept is used.

More specifically, the examples described herein are based on the following.

"Responding" UE (e.g., Anchor UE)

The responding UE is configured (from LMF/server UE/autonomously) to transmit a "response" SL PRS (e.g., based on lower layer signaling-based (e.g. SCI-based) trigger from the "initiating" UE, or pre-configuration) whose configuration is determined in relation to the configuration of the "initial" SL PRS transmitted by the "initiating" UE as follows (Option 0, Option 1, Option 2, Option 3):

Option 0 ("no PRS pre-configured at the "responding" UE"): the configuration of the "response" SL PRS completely or at least partially reuses ("mirrors") the configuration of the "initial" SL PRS configuration as defined in the associated SCI. Partial mirroring (e.g. the reuse of only bandwidth and comb size parameters) can be configured explicitly by LMF, or as an autonomous (implementation-specific) decision.

Option 1 ("single PRS pre-configured at the "responding" UE"): the configuration of a pre-configured (single) default SL PRS is used for the "responding" SL PRS.

Option 2 ("multiple PRSs pre-configured at the "responding" UE"): the configuration of the "closest" of multiple possible (pre-configured) SL PRSs is used for the "responding" SL PRS whereby the term "closest" is understood in the sense of relevant parameters (e.g., bandwidth or comb size) being the same or better with as little difference ("closeness") as possible (e.g., to minimize resource usage/overhead).

Option 3 ("PRS mapping pre-configured at the "responding" UE"): the configuration of the "responding" SL PRS is determined based on guidance (e.g. in the form of a mapping between "initial" and "responding" SL PRSs) provided by the LMF/server UE/autonomously.

"Initiating" UE (e.g., Target UE)

The initiating UE (e.g. the target UE) exploits the mechanism for determining the "responding" SL PRS configuration (Options 0-3) at the "responding" UE by configuring its own SL PRS transmission ("initiating PRS") such that the "responding UE" satisfies specific minimum requirement(s). For example, the "initiating" SL PRS itself is characterized by said minimum requirements to that the "responding" SL PRS is forced to maintain them too.

The initiating UE switches to SL PRS transmission mode that employs (higher-layer) pre-configuration at both the "initiating" and "responding" UE if the "responding" SL PRS does not meet the desired minimum requirements. In one example, the "initiating" UE requests session-based positioning with explicit pre-configuration (e.g. using Option 1 for SL PRS configuration). Alternatively, the "initiating" UE requests the "responding UE to switch between options for determining the configuration of "responding" SL PRS.

The initiating UE is given an indication by the LMF/server UE how the SL PRS configuration will be determined at the "responding" UE (i.e., which Option(s) 0-3 are used).

The devices and methods described herein will be described in more detail using the following examples.

Example 1

Figure 2:
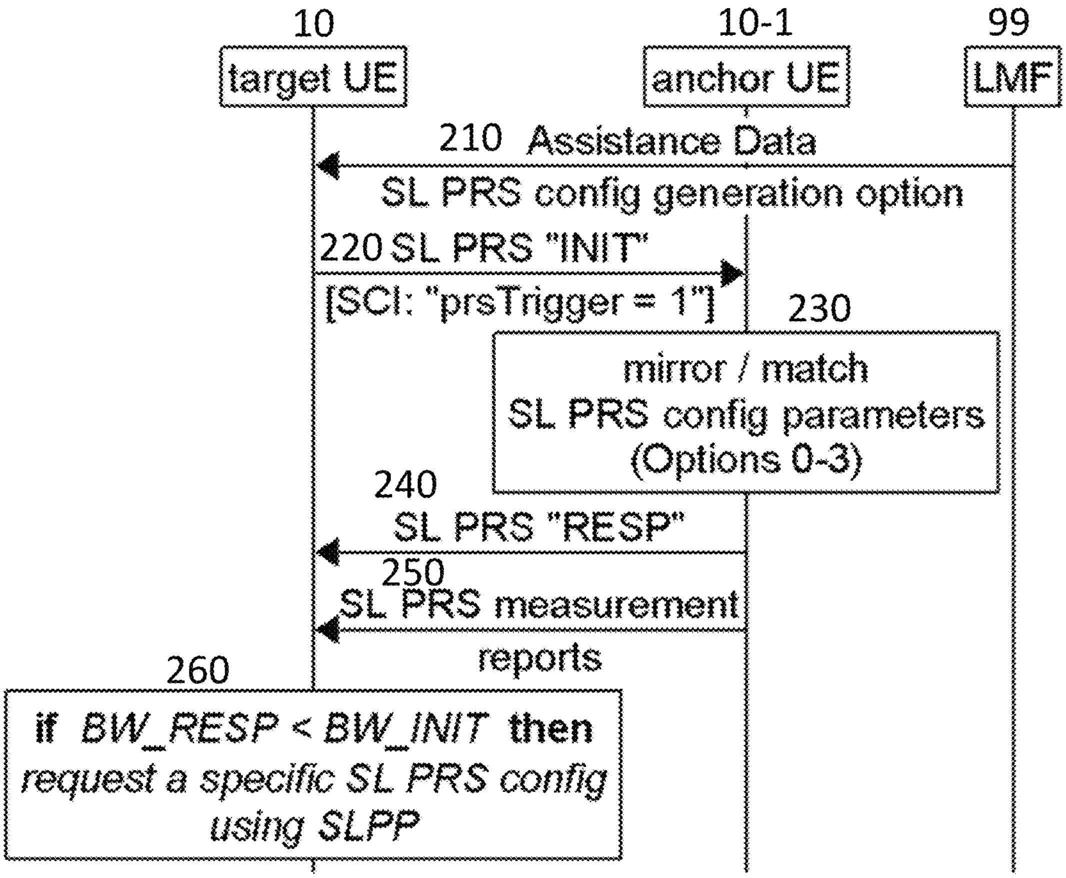
FIG. 2 is a signaling diagram of a first example implementing the herein described examples.

In the first example (see FIG. 2), target UE 10 wants to determine its location with certain accuracy using SL RTT with an anchor UE 10-1.

At 210, the LMF 99 sends Assistance Data which specifies that which Option for SL PRS config determination is used at the anchor UE. Note that anchor UE may also be configured by the LMF on which Option to be used.

At 220, during the "initial" (INIT) SL PRS transmission by the target UE, the SCI "prsTrigger" flag is raised to the value 1 to trigger a "response" SL PRS transmission.

At 230, the anchor UE observes this flag and at 240, responds with its own SL PRS transmission. The configuration of this "responding" (RESP) SL PRS 240, any of the Options 1-3 may be used. For example, the same configuration as used for both INIT 220 and SL PRS "RESP" 240. Then at 250 the SL PRS measurements are sent back to the target UE. Note that, the measurement may also be sent to LMF 99 in case the position computation in performed at the LMF. In this example, target itself is assumed to be performing position computation.

At 260, the target UE may evaluate the quality of the SL PRS "RESP" configuration. If any of the parameters does not meet the expectation (e.g., the bandwidth BW of the SL PRS "RESP" is smaller than the one of the SL PRS "INIT"), then the target UE may request a more specific SL PRS configuration by engaging in SLPP interaction with the anchor UE.

As shown at 230 the anchor UE 10-1 determines the SL PRS configuration parameters based on option 1, option 2 or option 3. For example, SL PRS configuration may be determined based on option 1.

Example 2

Figure 3:
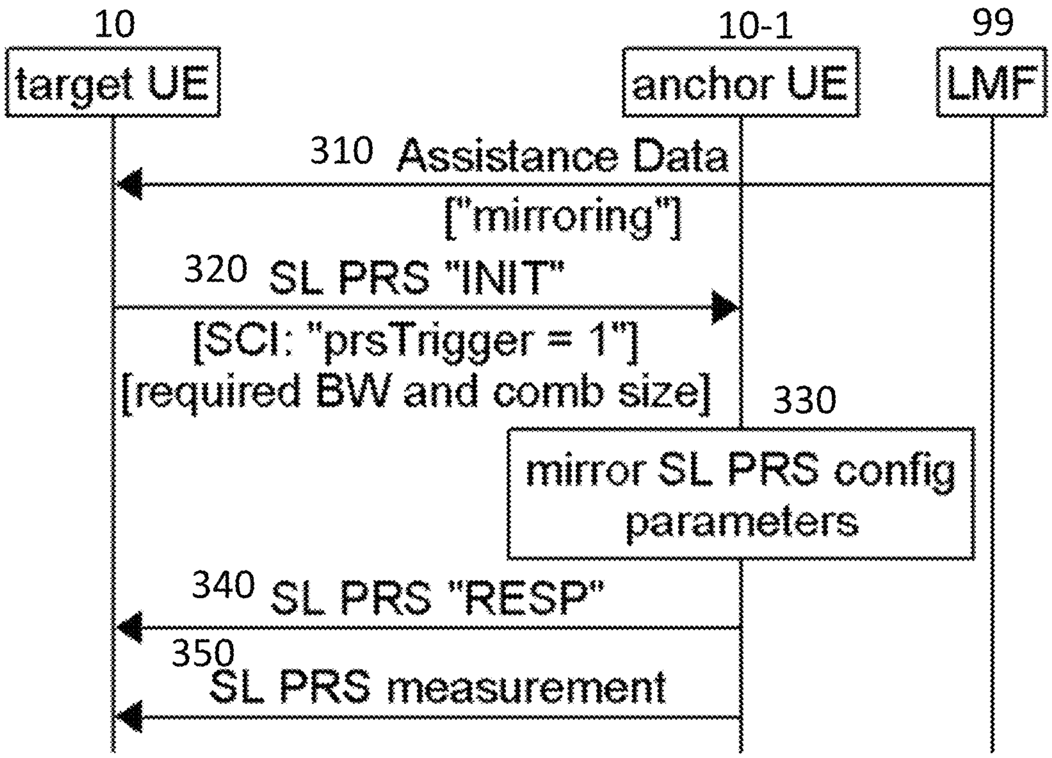
FIG. 3 is a signaling diagram of a second example implementing the herein described examples.

The second example (see FIG. 3) is similar to the first example but there are some differences. The assistance data sent at 310 contains an indication that UEs would use the "mirroring" Option 0.

At 320, the SL PRS "INIT" is then transmitted with some required bandwidth BD and comb size as the target UE was made aware by the LMF that the responding anchor UE will match this configuration. At 330, the anchor UE mirrors SL PRS configuration parameters.

The responding SL PRS "RESP" sent at 340 will then be characterized by the required parameters which preserves the achievable positioning set out by the parameters of the initial SL PRS "INIT" 320. No degradation is expected to occur and hence the target UE 10 will have not the need to require a reconfiguration of the positioning session as in the first example.

At 350 an SL PRS measurement is transmitted from the anchor UE 10-1 to the target UE 10.

In an embodiment, the proposed scheme can also be used for DL TDOA-like SL TDOA where a target UE can trigger anchor UEs to transmit SL PRS by sending a SCI-based trigger and performing SL PRS transmission (even though SL PRS transmission is not needed from the target UE) so that the anchor UEs can mirror or match their SL PRS transmission configuration as per the received SL PRS.

The examples described herein target SL positioning, which is a key technology for many use cases including public safety, V2X, and industrial IoT. SL positioning will be standardized in 3GPP Release 18, and it will potentially impact TS 38.355, TS 37.355, etc.

Figure 4:
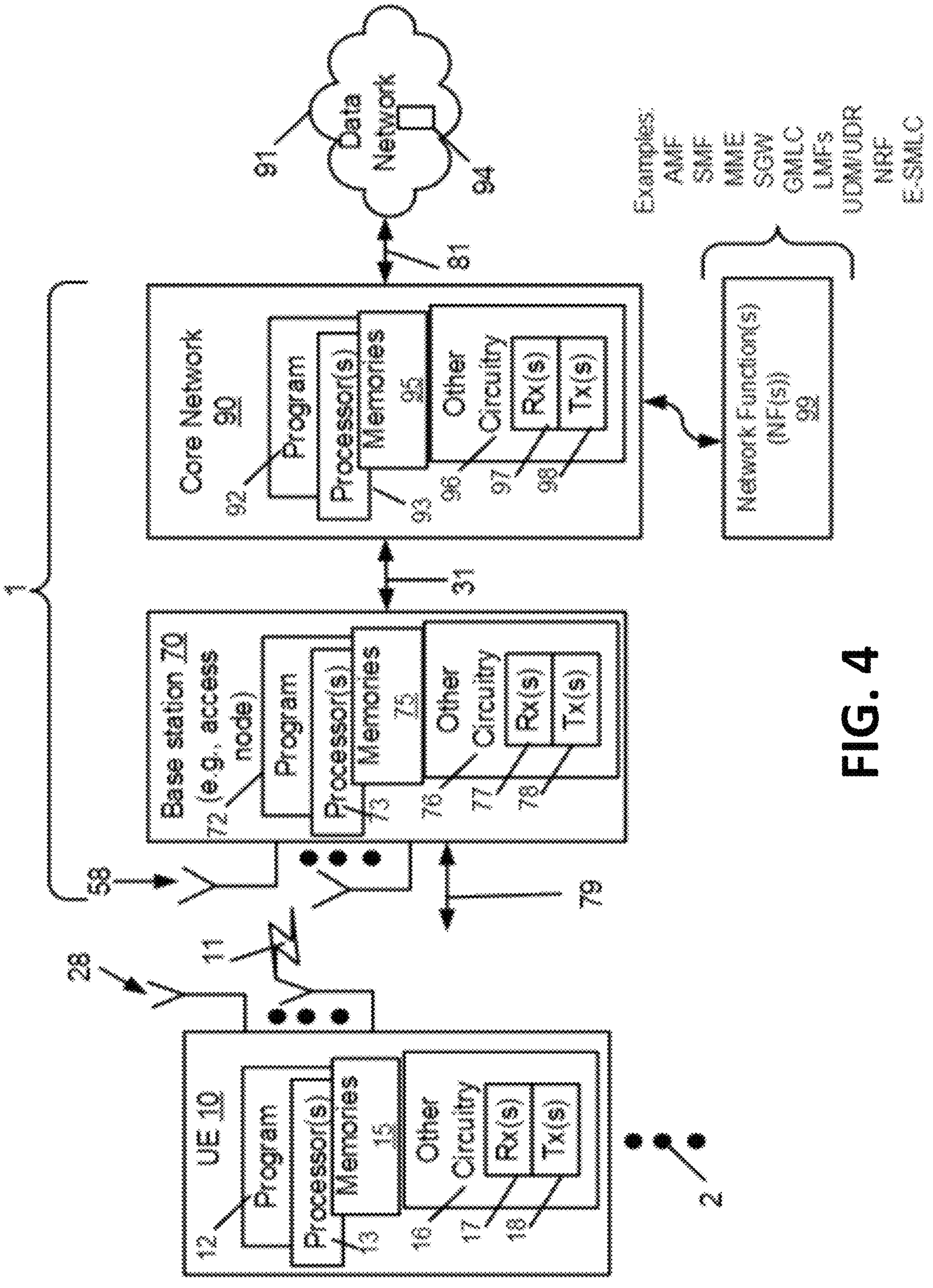
FIG. 4 is a block diagram of one possible and non-limiting system in which the example embodiments may be practiced.

FIG. 4 shows a block diagram of one possible and non-limiting example of a cellular network 1 that is connected to a user equipment (UE) 10. A number of network elements are shown in the cellular network of FIG. 4: a base station 70; and a core network 90.

In FIG. 4, a user equipment (UE) 10 is in wireless communication via radio link 11 with the base station 70 of the cellular network 1. A UE 10 is a wireless communication device, such as a mobile device, that is configured to access a cellular network. The UE 10 is illustrated with one or more antennas 28. The ellipses 2 indicate there could be multiple UEs 10 in wireless communication via radio links with the base station 70. The UE 10 includes one or more processors 13, one or more memories 15, and other circuitry 16. The other circuitry 16 includes one or more receivers (Rx(s)) 17 and one or more transmitters (Tx(s)) 18. A program 12 is used to cause the UE 10 to perform the operations described herein. For a UE 10, the other circuitry 16 could include circuitry such as for user interface elements (not shown) like a display.

The base station 70, as a network element of the cellular network 1, provides the UE 10 access to cellular network 1 and to the data network 91 via the core network 90 (e.g., via a user plane function (UPF) of the core network 90). The base station 70 is illustrated as having one or more antennas 58. In general, the base station 70 is referred to as RAN node 70 herein. An example of a RAN node 70 is a gNB. There are, however, many other examples of RAN nodes including an eNB (LTE base station) or transmission reception point (TRP). The base station 70 includes one or more processors 73, one or more memories 75, and other circuitry 76. The other circuitry 76 includes one or more receivers (Rx(s)) 77 and one or more transmitters (Tx(s)) 78. A program 72 is used to cause the base station 70 to perform the operations described herein.

It is noted that the base station 70 may instead be implemented via other wireless technologies, such as Wi-Fi (a wireless networking protocol that devices use to communicate without direct cable connections). In the case of Wi-Fi, the link 11 could be characterized as a wireless link.

Two or more base stations 70 communicate using, e.g., link(s) 79. The link(s) 79 may be wired or wireless or both and may implement, e.g., an Xn interface for fifth generation (5G), an X2 interface for LTE, or other suitable interface for other standards.

The cellular network 1 may include a core network 90, as a third illustrated element or elements, that may include core network functionality, and which provide connectivity via a link or links 81 with a data network 91, such as a telephone network and/or a data communications network (e.g., the Internet). The core network 90 includes one or more processors 93, one or more memories 95, and other circuitry 96. The other circuitry 96 includes one or more receivers (Rx(s)) 97 and one or more transmitters (Tx(s)) 98. A program 92 is used to cause the core network 90 to perform the operations described herein.

The core network 90 could be a 5GC (5G core network). The core network 90 can implement or comprise multiple network functions (NF(s)) 99, and the program 92 may comprise one or more of the NFs 99. A 5G core network may use hardware such as memory and processors and a virtualization layer. It could be a single standalone computing system, a distributed computing system, or a cloud computing system. The NFs 99, as network elements, of the core network could be containers or virtual machines running on the hardware of the computing system(s) making up the core network 90.

Core network functionality for 5G may include access and mobility management functionality that is provided by a network function 99 such as an access and mobility management function (AMF(s)), session management functionality that is provided by a network function such as a session management function (SMF). Core network functionality for access and mobility management in an LTE network may be provided by an MME (Mobility Management Entity) and/or SGW (Serving Gateway) functionality, which routes data to the data network. Many others are possible, as illustrated by the examples in FIG. 4: AMF; SMF; MME; SGW; gateway mobile location center (GMLC); location management functions (LMFs); unified data management (UDM); unified data repository (UDR); network repository function (NRF); and/or evolved serving mobile location center (E-SMLC). These are merely exemplary core network functionality that may be provided by the core network 90, and note that both 5G and LTE core network functionality might be provided by the core network 90. The radio access network (RAN) node 70 is coupled via a backhaul link 31 to the core network 90. The RAN node 70 and the core network 90 may include an NG interface for 5G, or an S1 interface for LTE, or other suitable interface for other radio access technologies for communicating via the backhaul link 31.

In the data network 91, there is a computer-readable medium 94. The computer-readable medium 94 contains instructions that, when downloaded and installed into the memories 15, 75, or 95 of the corresponding UE 10, base station 70, and/or core network element(s) 90, and executed by processor(s) 13, 73, or 93, cause the respective device to perform corresponding actions described herein. The computer-readable medium 94 may be implemented in other forms, such as via a compact disc or memory stick.

The programs 12, 72, and 92 contain instructions stored by corresponding one or more memories 15, 75, or 95. These instructions, when executed by the corresponding one or more processors 13, 73, or 93, cause the corresponding apparatus 10, 70, or 90, to perform the operations described herein. The computer readable memories 15, 75, or 95 may be of any type suitable to the local technical environment and may be implemented using any suitable data storage technology, such as semiconductor-based memory devices, flash memory, firmware, magnetic memory devices and systems, optical memory devices and systems, fixed memory and removable memory. The computer readable memories 15, 75, and 95 may be means for performing storage functions. The processors 13, 73, and 93, may be of any type suitable to the local technical environment, and may include one or more of general-purpose computers, special purpose computers, microprocessors, digital signal processors (DSPs) and processors based on a multi-core processor architecture, as non-limiting examples. The processors 13, 73, and 93 may be means for causing their respective apparatus to perform functions, such as those described herein.

The receivers 17, 77, and 97, and the transmitters 18, 78, and 98 may implement wired or wireless interfaces. The receivers and transmitters may be grouped together as transceivers.

Figure 5:
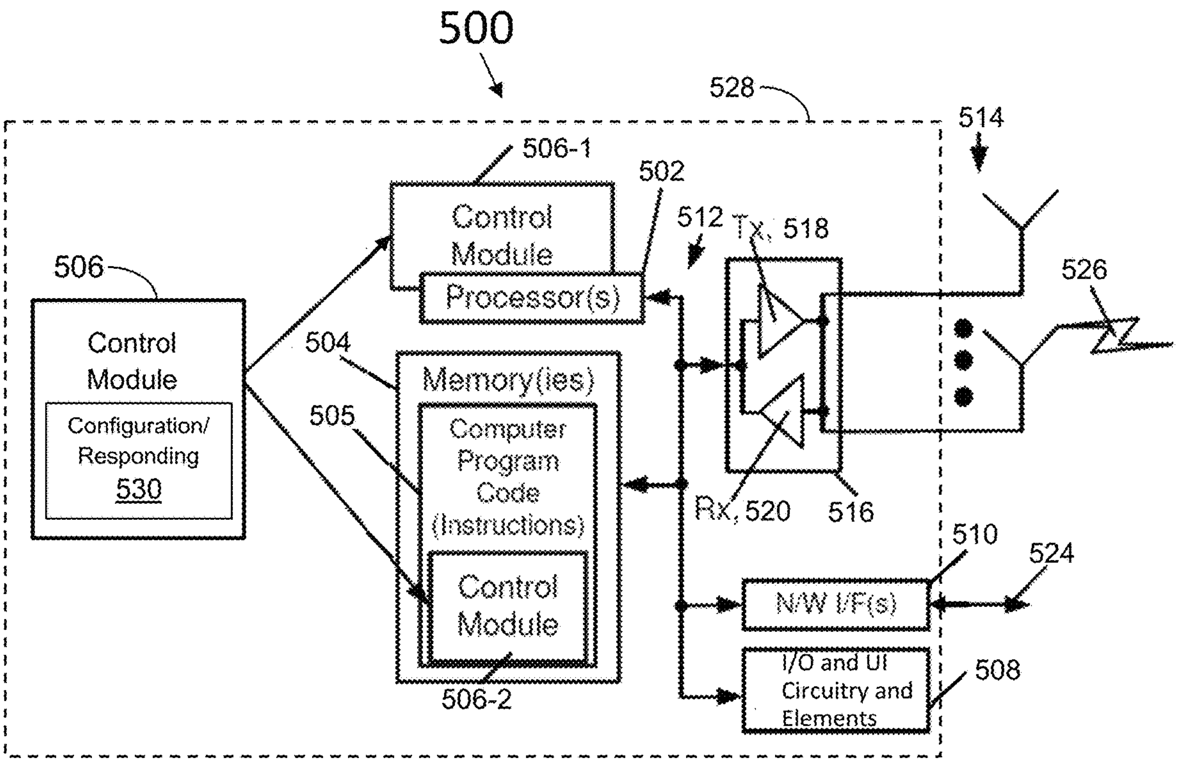
FIG. 5 is an example apparatus configured to implement the examples described herein.

FIG. 5 is an example apparatus 500, which may be implemented in hardware, configured to implement the examples described herein. The apparatus 500 comprises at least one processor 502 (e.g. an FPGA and/or CPU), one or more memories 504 including computer program code 505, the computer program code 505 having instructions to carry out the methods described herein, wherein the at least one memory 504 and the computer program code 505 are configured to, with the at least one processor 502, cause the apparatus 500 to implement circuitry, a process, component, module, or function (implemented with control module 506) to implement the examples described herein, including configuration of dynamically triggered SL PRS transmissions. The memory 504 may be a non-transitory memory, a transitory memory, a volatile memory (e.g. RAM), or a non-volatile memory (e.g. ROM). Configuration/responding 530 of the control module implements the herein described aspects related to configuration of dynamically triggered SL PRS transmissions.

The apparatus 500 includes a display and/or I/O interface 508, which includes user interface (UI) circuitry and elements, that may be used to display aspects or a status of the methods described herein (e.g., as one of the methods is being performed or at a subsequent time), or to receive input from a user such as with using a keypad, camera, touchscreen, touch area, microphone, biometric recognition, one or more sensors, etc. The apparatus 500 includes one or more communication e.g. network (N/W) interfaces (I/F(s)) 510. The communication I/F(s) 510 may be wired and/or wireless and communicate over the Internet/other network (s) via any communication technique including via one or more links 524. The link(s) 524 may be the link(s) 11 and/or 79 and/or 31 and/or 81 from FIG. 4. The link(s) 11 and/or 79 and/or 31 and/or 81 from FIG. 4 may also be implemented using transceiver(s) 516 and corresponding wireless link(s) 526. The communication I/F(s) 510 may comprise one or more transmitters or one or more receivers.

The transceiver 516 comprises one or more transmitters 518 and one or more receivers 520. The transceiver 516 and/or communication I/F(s) 510 may comprise standard well-known components such as an amplifier, filter, frequency-converter, (de) modulator, and encoder/decoder circuitries and one or more antennas, such as antennas 514 used for communication over wireless link 526.

The control module 506 of the apparatus 500 comprises one of or both parts 506-1 and/or 506-2, which may be implemented in a number of ways. The control module 506 may be implemented in hardware as control module 506-1, such as being implemented as part of the one or more processors 502. The control module 506-1 may be implemented also as an integrated circuit or through other hardware such as a programmable gate array. In another example, the control module 506 may be implemented as control module 506-2, which is implemented as computer program code (having corresponding instructions) 505 and is executed by the one or more processors 502. For instance, the one or more memories 504 store instructions that, when executed by the one or more processors 502, cause the apparatus 500 to perform one or more of the operations as described herein. Furthermore, the one or more processors 502, the one or more memories 504, and example algorithms (e.g., as flowcharts and/or signaling diagrams), encoded as instructions, programs, or code, are means for causing performance of the operations described herein.

The apparatus 500 to implement the functionality of control 506 may be UE 10, base station 70 (e.g. gNB 70), or core network 90 including any of the network functions 99 such as LMF 99, which network functions 99 may be implemented with a network entity. Thus, processor 502 may correspond to processor(s) 13, processor(s) 73 and/or processor(s) 93, memory 504 may correspond to one or more memories 15, one or more memories 75 and/or one or more memories 95, computer program code 505 may correspond to program 12, program 72, or program 92, communication I/F(s) 510 and/or transceiver 516 may correspond to other circuitry 16, other circuitry 76, or other circuitry 96, and antennas 514 may correspond to antennas 28 or antennas 58.

Alternatively, apparatus 500 and its elements may not correspond to either of UE 10, base station 70, or core network and their respective elements, as apparatus 500 may be part of a self-organizing/optimizing network (SON) node or other node, such as a node in a cloud.

Apparatus 500 may correspond to anchor UE 10-1, anchor UE 10-2, or anchor UE 10-3. The anchor UEs (10-1, 10-2, 10-3) may be configured similarly to UE 10 as shown in FIG. 4. Apparatus 500 may correspond to a network entity that performs the functionality of LMF 99.

The apparatus 500 may also be distributed throughout the network (e.g. 91) including within and between apparatus 500 and any network element (such as core network 90 and/or the base station 70 and/or the UE 10).

Interface 512 enables data communication and signaling between the various items of apparatus 500, as shown in FIG. 5. For example, the interface 512 may be one or more buses such as address, data, or control buses, and may include any interconnection mechanism, such as a series of lines on a motherboard or integrated circuit, fiber optics or other optical communication equipment, and the like. Computer program code (e.g. instructions) 505, including control 506 may comprise object-oriented software configured to pass data or messages between objects within computer program code 505. The apparatus 500 need not comprise each of the features mentioned, or may comprise other features as well. The various components of apparatus 500 may at least partially reside in a common housing 528, or a subset of the various components of apparatus 500 may at least partially be located in different housings, which different housings may include housing 528.

Figure 6:
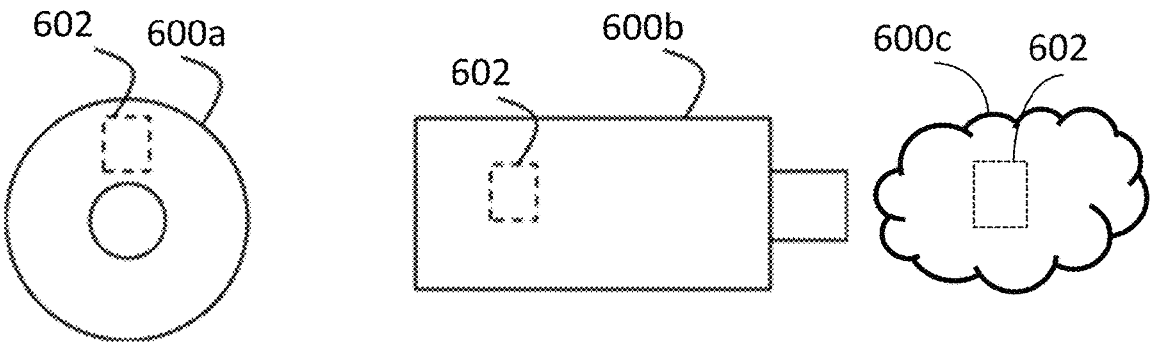
FIG. 6 shows a representation of an example of non-volatile memory media used to store instructions that implement the examples described herein.

FIG. 6 shows a schematic representation of non-volatile memory media 600*a* (e.g. computer/compact disc (CD) or digital versatile disc (DVD)) and 600*b* (e.g. universal serial bus (USB) memory stick) and 600*c* (e.g. cloud storage for downloading instructions and/or parameters 602 or receiving emailed instructions and/or parameters 602) storing instructions and/or parameters 602 which when executed by a processor allows the processor to perform one or more of the steps of the methods described herein.

Figure 7:
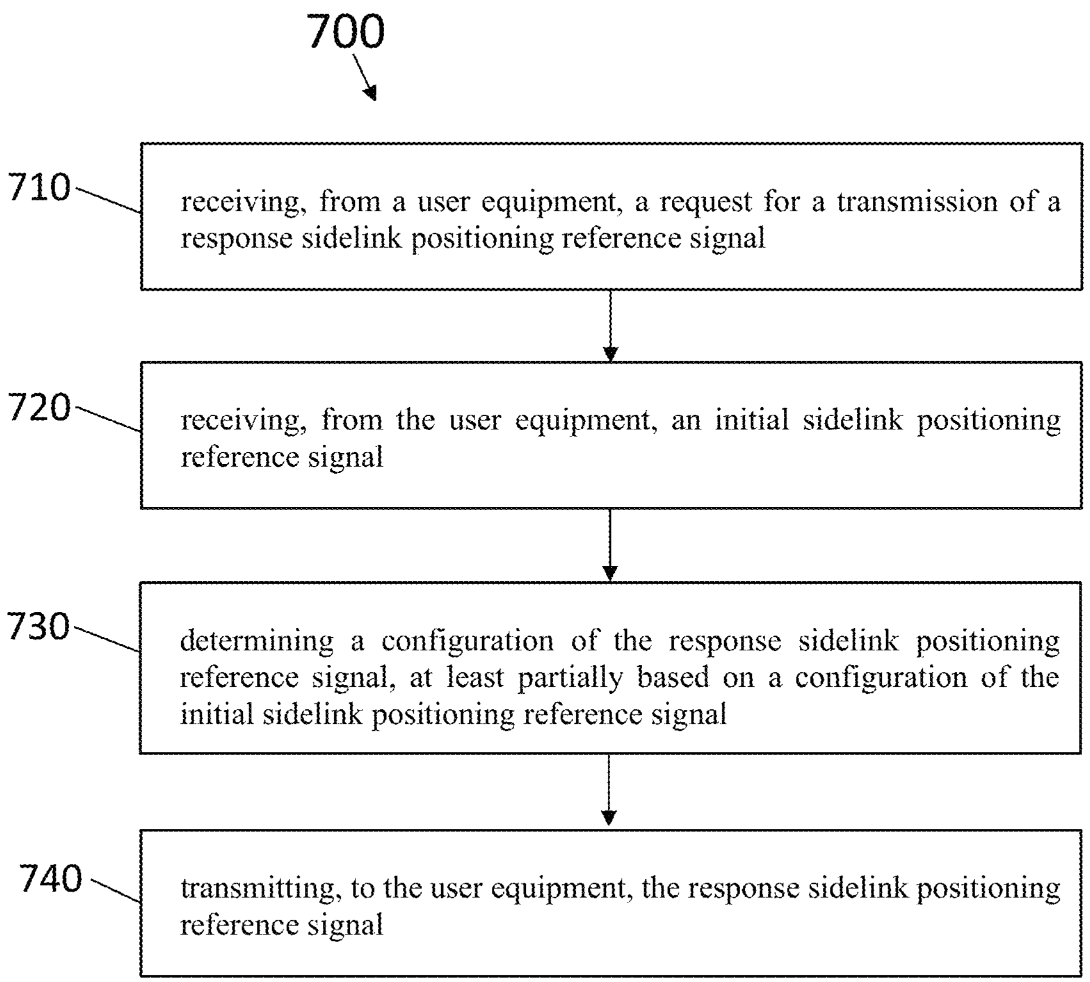
FIG. 7 is an example method, based on the examples described herein.

FIG. 7 is an example method 700, based on the example embodiments described herein. At 710, the method includes receiving, from a user equipment, a request for a transmission of a response sidelink positioning reference signal. At 720, the method includes receiving, from the user equipment, an initial sidelink positioning reference signal. At 730, the method includes determining a configuration of the response sidelink positioning reference signal, at least partially based on a configuration of the initial sidelink positioning reference signal. At 740, the method includes transmitting, to the user equipment, the response sidelink positioning reference signal. Method 700 may be performed with anchor UE-A1 10-1, anchor UE-A2 10-2, anchor UE-A3 10-3, or apparatus 500.

Figure 8:
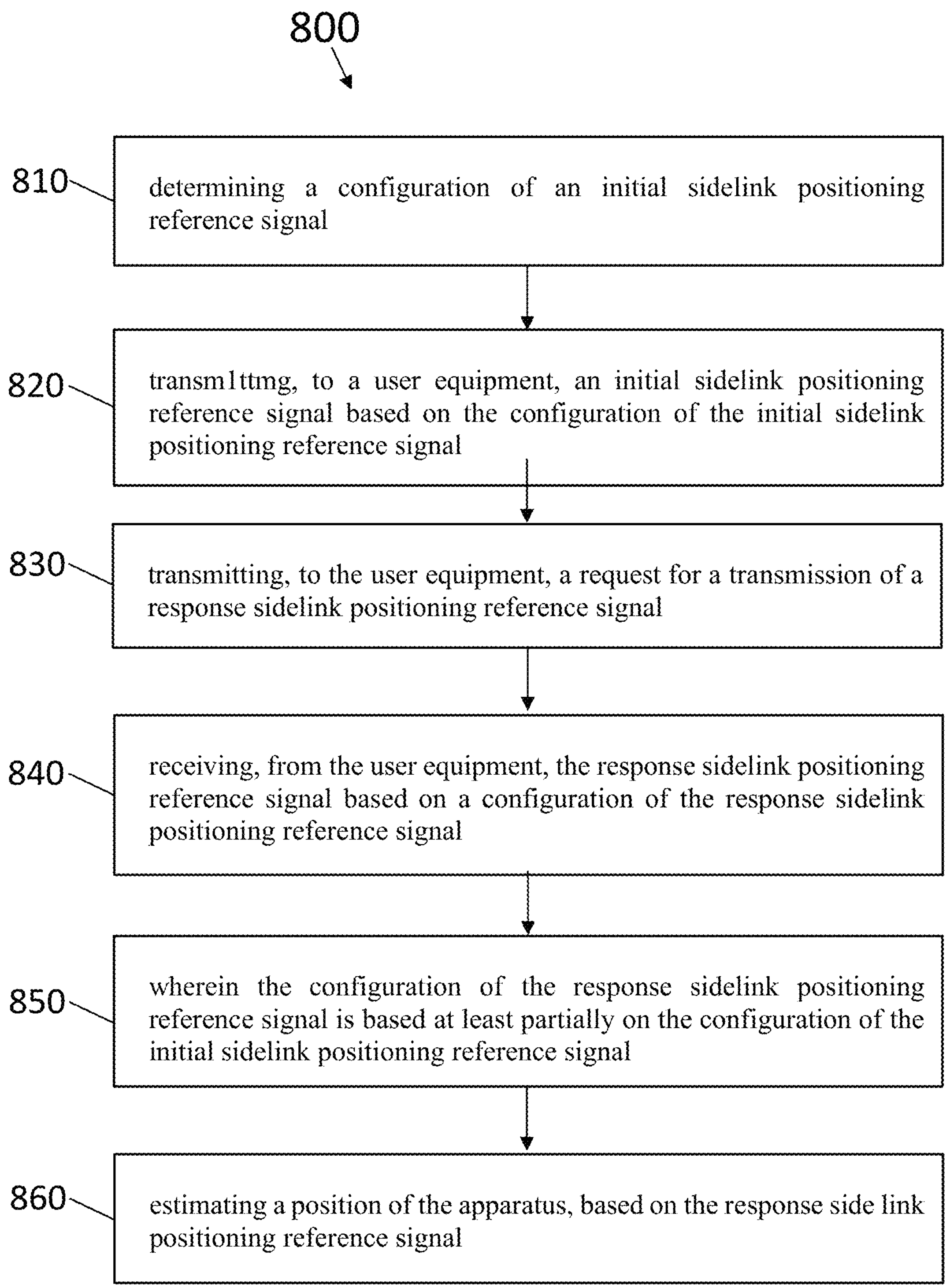
FIG. 8 is an example method, based on the examples described herein.

FIG. 8 is an example method 800, based on the example embodiments described herein. At 810, the method includes determining a configuration of an initial sidelink positioning reference signal. At 820, the method includes transmitting, to a user equipment, an initial sidelink positioning reference signal based on the configuration of the initial sidelink positioning reference signal. At 830, the method includes transmitting, to the user equipment, a request for a transmission of a response sidelink positioning reference signal. At 840, the method includes receiving, from the user equipment, the response sidelink positioning reference signal based on a configuration of the response sidelink positioning reference signal. At 850, the method includes wherein the configuration of the response sidelink positioning reference signal is based at least partially on the configuration of the initial sidelink positioning reference signal. At 860, the method includes estimating a position of the apparatus, based on the response sidelink positioning reference signal. Method 800 may be performed with target UE 10 or apparatus 500.

Figure 9:
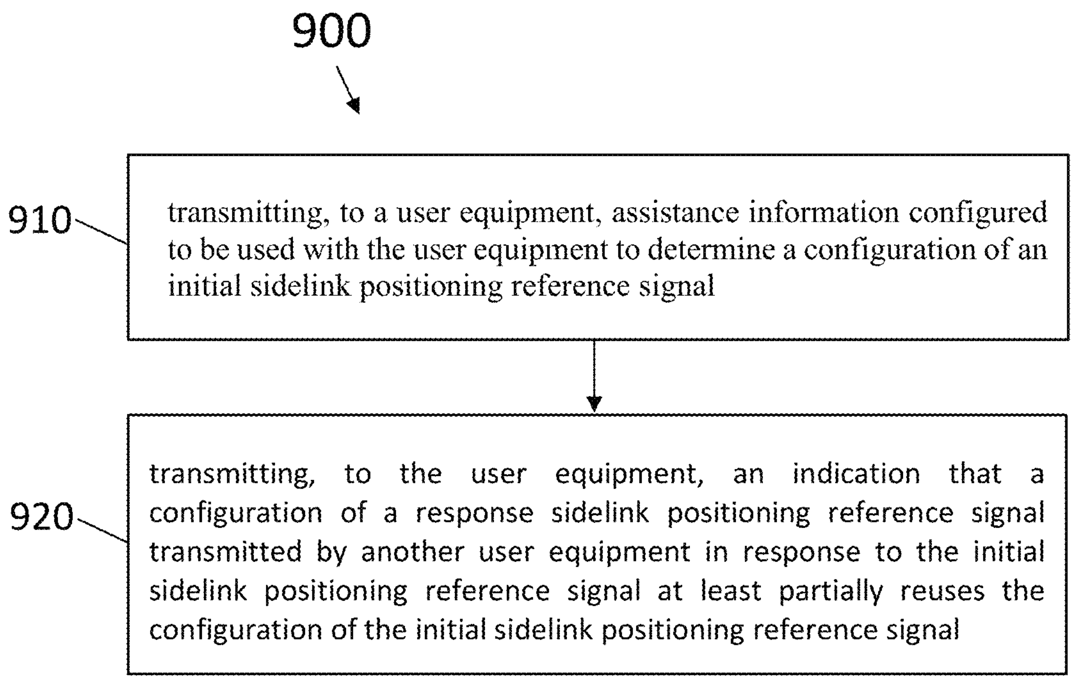
FIG. 9 is an example method, based on the examples described herein.

FIG. 9 is an example method 900, based on the example embodiments described herein. At 910, the method includes transmitting, to a user equipment, assistance information configured to be used with the user equipment to determine a configuration of an initial sidelink positioning reference signal. At 920, the method includes transmitting, to the user equipment, an indication that a configuration of a response sidelink positioning reference signal transmitted by another user equipment in response to the initial sidelink positioning reference signal at least partially reuses the configuration of the initial sidelink positioning reference signal. Method 900 may be performed with a network entity that implements LMF 99, or apparatus 500.

The following examples are provided and described herein.

Example 1. An apparatus including: at least one processor; and at least one memory storing instructions that, when executed by the at least one processor, cause the apparatus at least to: receive, from a user equipment, a request for a transmission of a response sidelink positioning reference signal; receive, from the user equipment, an initial sidelink positioning reference signal; determine a configuration of the response sidelink positioning reference signal, at least partially based on a configuration of the initial sidelink positioning reference signal; and transmit, to the user equipment, the response sidelink positioning reference signal.

Example 2. The apparatus of example 1, wherein a parameter of the configuration of the response sidelink positioning reference signal and a parameter of the configuration of the initial sidelink positioning reference signal relate to at least one of: bandwidth, comb size, or a number of symbols.

Example 3. The apparatus of any of examples 1 to 2, wherein the instructions, when executed by the at least one processor, cause the apparatus at least to: determine the configuration of the response sidelink positioning reference signal to at least partially reuse the configuration of the initial sidelink positioning reference signal.

Example 4. The apparatus of any of examples 1 to 3, wherein the instructions, when executed by the at least one processor, cause the apparatus at least to: determine the configuration of the response sidelink positioning reference signal based on a configuration of a preconfigured or configured sidelink positioning reference signal.

Example 5. The apparatus of example 4, wherein the instructions, when executed by the at least one processor, cause the apparatus at least to: receive, from a location management function or a server user equipment, the configured sidelink positioning reference signal.

Example 6. The apparatus of any of examples 1 to 5, wherein the instructions, when executed by the at least one processor, cause the apparatus at least to: select a configuration of a preconfigured or configured sidelink positioning reference signal from multiple configurations of respective multiple preconfigured or configured sidelink positioning reference signals; wherein the selected configuration of the preconfigured or configured sidelink positioning reference signal is associated with at least one parameter or combination of parameters having a value that is closer to at least one parameter or combination of parameters associated with the configuration of the initial sidelink positioning reference signal than a respective at least one parameter or combination of parameters associated with a respective other configuration of another preconfigured or configured sidelink positioning reference signal; and determine the configuration of the response sidelink positioning reference signal to comprise the selected configuration of the preconfigured or configured sidelink positioning reference signal.

Example 7. The apparatus of any of examples 1 to 6, wherein the instructions, when executed by the at least one processor, cause the apparatus at least to: determine the configuration of the response sidelink positioning reference signal based on at least one mapping between a mapped configuration of an initial sidelink positioning reference signal and a respective mapped configuration of a responding sidelink positioning reference signal.

Example 8. The apparatus of example 7, wherein the instructions, when executed by the at least one processor, cause the apparatus at least to: receive the at least one mapping from a location management function or a server user equipment.

Example 9. The apparatus of any of examples 1 to 8, wherein the instructions, when executed by the at least one processor, cause the apparatus at least to: receive, from the user equipment, a request to transmit another response sidelink positioning reference signal based on another configuration of the another response sidelink positioning reference signal, when at least one parameter of the configuration of the response sidelink positioning reference signal does not meet at least one expectation.

Example 10. The apparatus of example 9, wherein the at least one expectation comprises a bandwidth of the configuration of the response sidelink positioning reference being smaller than a bandwidth of the configuration of the initial sidelink positioning reference signal.

Example 11. The apparatus of any of examples 1 to 10, wherein the instructions, when executed by the at least one processor, cause the apparatus at least to: receive, from the user equipment, at least one parameter of the configuration of the initial sidelink positioning reference signal; and determine at least one parameter of the configuration of the response sidelink positioning to be within a threshold value of the at least one parameter of the configuration of the initial sidelink positioning reference signal.

Example 12. The apparatus of any of examples 1 to 11, wherein the request for the transmission of the response sidelink positioning reference signal is based on lower layer signaling.

Example 13. The apparatus of example 12, wherein the lower layer signaling comprises sidelink control information or the initial sidelink positioning reference signal.

Example 14. An apparatus including: at least one processor; and at least one memory storing instructions that, when executed by the at least one processor, cause the apparatus at least to: determine a configuration of an initial sidelink positioning reference signal; transmit, to a user equipment, an initial sidelink positioning reference signal based on the configuration of the initial sidelink positioning reference signal; transmit, to the user equipment, a request for a transmission of a response sidelink positioning reference signal; receive, from the user equipment, the response sidelink positioning reference signal based on a configuration of the response sidelink positioning reference signal; wherein the configuration of the response sidelink positioning reference signal is based at least partially on the configuration of the initial sidelink positioning reference signal; and estimate a position of the apparatus, based on the response sidelink positioning reference signal.

Example 15. The apparatus of example 14, wherein a parameter of the configuration of the response sidelink positioning reference signal and a parameter of the configuration of the initial sidelink positioning reference signal relate to at least one of: bandwidth, or comb size, or a number of symbols.

Example 16. The apparatus of any of examples 14 to 15, wherein the configuration of the response sidelink positioning reference signal at least partially reuses the configuration of the initial sidelink positioning reference signal.

Example 17. The apparatus of any of examples 14 to 16, wherein the configuration of the response sidelink positioning reference signal is based on a configuration of a preconfigured or configured sidelink positioning reference signal.

Example 18. The apparatus of example 17, wherein the configured sidelink positioning reference signal is provided by a location management function or a server user equipment.

Example 19. The apparatus of any of examples 14 to 18, wherein the configuration of the response sidelink positioning reference signal comprises a configuration of a preconfigured or configured sidelink positioning reference signal, and is associated with at least one parameter or combination of parameters having a value that is closer to at least one parameter or combination of parameters associated with the configuration of the initial sidelink positioning reference signal than a respective at least one parameter or combination of parameters associated with a respective other configuration of another preconfigured or configured sidelink positioning reference signal.

Example 20. The apparatus of any of examples 14 to 19, wherein the configuration of the response sidelink positioning reference signal is based on at least one mapping between a mapped configuration of an initial sidelink positioning reference signal and a respective mapped configuration of a responding sidelink positioning reference signal.

Example 21. The apparatus of any of examples 14 to 20, wherein the instructions, when executed by the at least one processor, cause the apparatus at least to: receive, from a location management function or a server user equipment, an indication of a method the user equipment uses to determine the configuration of the response sidelink positioning reference signal; and determine the configuration of the initial sidelink positioning reference signal based on the indication of the method the user equipment uses to determine the configuration of the response sidelink positioning reference signal received from the location management function or the server user equipment.

Example 22. The apparatus of any of examples 14 to 21, wherein the instructions, when executed by the at least one processor, cause the apparatus at least to: determine whether at least one parameter of the configuration of the response sidelink positioning reference signal meets at least one expectation; and transmit, to the user equipment, a request to transmit another response sidelink positioning reference signal based on another configuration of the another response sidelink positioning reference signal, in response to the at least one parameter of the configuration of the response sidelink positioning reference signal not meeting the at least one expectation.

Example 23. The apparatus of example 22, wherein the at least one expectation comprises a bandwidth of the configuration of the response sidelink positioning reference being smaller than a bandwidth of the configuration of the initial sidelink positioning reference signal.

Example 24. The apparatus of any of examples 14 to 23, wherein the instructions, when executed by the at least one processor, cause the apparatus at least to: receive, from a network entity, an indication that the configuration of the response sidelink positioning reference signal at least partially reuses the configuration of the initial sidelink positioning reference signal; and determine at least one parameter of the configuration of the initial sidelink positioning reference signal, based on the indication received from the network entity that the configuration of the response sidelink positioning reference signal at least partially reuses the configuration of the initial sidelink positioning reference signal.

Example 25. The apparatus of any of examples 14 to 24, wherein the request for the transmission of the response sidelink positioning reference signal is based on lower layer signaling.

Example 26. The apparatus of example 25, wherein the lower layer signaling comprises sidelink control information or the initial sidelink positioning reference signal.

Example 27. An apparatus including: at least one processor; and at least one memory storing instructions that, when executed by the at least one processor, cause the apparatus at least to: transmit, to a user equipment, assistance information configured to be used with the user equipment to determine a configuration of an initial sidelink positioning reference signal; and transmit, to the user equipment, an indication that a configuration of a response sidelink positioning reference signal transmitted by another user equipment in response to the initial sidelink positioning reference signal at least partially reuses the configuration of the initial sidelink positioning reference signal.

Example 28. The apparatus of example 27, wherein the instructions, when executed by the at least one processor, cause the apparatus at least to: transmit, to the user equipment, an indication of a method the another user equipment uses to determine the configuration of the response sidelink positioning reference signal.

Example 29. The apparatus of any of examples 27 to 28, wherein the instructions, when executed by the at least one processor, cause the apparatus at least to: transmit, to the another user equipment, at least one mapping between a mapped configuration of an initial sidelink positioning reference signal and a respective mapped configuration of a responding sidelink positioning reference signals; wherein the at least one mapping is configured to be used with the another user equipment to determine the configuration of the response sidelink positioning reference signal.

Example 30. The apparatus of any of examples 27 to 29, wherein the instructions, when executed by the at least one processor, cause the apparatus at least to: receive, from the another user equipment, at least one measurement based on the initial sidelink positioning reference signal; and determine a location of the user equipment, based on the at least one measurement.

Example 31. The apparatus of any of examples 27 to 30, wherein the apparatus comprises a location management function or a server user equipment.

Example 32. The apparatus of any of examples 27 to 31, wherein the instructions, when executed by the at least one processor, cause the apparatus at least to: transmit, to the another user equipment, a configured sidelink positioning reference signal; wherein the configuration of the response sidelink positioning reference signal transmitted by another user equipment is based on the configured sidelink positioning reference signal transmitted to the another user equipment.

Example 33. A method including: receiving, from a user equipment, a request for a transmission of a response sidelink positioning reference signal; receiving, from the user equipment, an initial sidelink positioning reference signal; determining a configuration of the response sidelink positioning reference signal, at least partially based on a configuration of the initial sidelink positioning reference signal; and transmitting, to the user equipment, the response sidelink positioning reference signal.

Example 34. A method including: determining a configuration of an initial sidelink positioning reference signal; transmitting, to a user equipment, an initial sidelink positioning reference signal based on the configuration of the initial sidelink positioning reference signal; transmitting, to the user equipment, a request for a transmission of a response sidelink positioning reference signal; receiving, from the user equipment, the response sidelink positioning reference signal based on a configuration of the response sidelink positioning reference signal; wherein the configuration of the response sidelink positioning reference signal is based at least partially on the configuration of the initial sidelink positioning reference signal; and estimating a position of the apparatus, based on the response sidelink positioning reference signal.

Example 35. A method including: transmitting, to a user equipment, assistance information configured to be used with the user equipment to determine a configuration of an initial sidelink positioning reference signal; and transmitting, to the user equipment, an indication that a configuration of a response sidelink positioning reference signal transmitted by another user equipment in response to the initial sidelink positioning reference signal at least partially reuses the configuration of the initial sidelink positioning reference signal.

Example 36. An apparatus including: means for receiving, from a user equipment, a request for a transmission of a response sidelink positioning reference signal; means for receiving, from the user equipment, an initial sidelink positioning reference signal; means for determining a configuration of the response sidelink positioning reference signal, at least partially based on a configuration of the initial sidelink positioning reference signal; and means for transmitting, to the user equipment, the response sidelink positioning reference signal.

Example 37. An apparatus including: means for determining a configuration of an initial sidelink positioning reference signal; means for transmitting, to a user equipment, an initial sidelink positioning reference signal based on the configuration of the initial sidelink positioning reference signal; means for transmitting, to the user equipment, a request for a transmission of a response sidelink positioning reference signal; means for receiving, from the user equipment, the response sidelink positioning reference signal based on a configuration of the response sidelink positioning reference signal; wherein the configuration of the response sidelink positioning reference signal is based at least partially on the configuration of the initial sidelink positioning reference signal; and means for estimating a position of the apparatus, based on the response sidelink positioning reference signal.

Example 38. An apparatus including: means for transmitting, to a user equipment, assistance information configured to be used with the user equipment to determine a configuration of an initial sidelink positioning reference signal; and means for transmitting, to the user equipment, an indication that a configuration of a response sidelink positioning reference signal transmitted by another user equipment in response to the initial sidelink positioning reference signal at least partially reuses the configuration of the initial sidelink positioning reference signal.

Example 39. A non-transitory program storage device readable by a machine, tangibly embodying a program of instructions executable by the machine for performing operations, the operations including: receiving, from a user equipment, a request for a transmission of a response sidelink positioning reference signal; receiving, from the user equipment, an initial sidelink positioning reference signal; determining a configuration of the response sidelink positioning reference signal, at least partially based on a configuration of the initial sidelink positioning reference signal; and transmitting, to the user equipment, the response sidelink positioning reference signal.

Example 40. A non-transitory program storage device readable by a machine, tangibly embodying a program of instructions executable by the machine for performing operations, the operations including: determining a configuration of an initial sidelink positioning reference signal;

transmitting, to a user equipment, an initial sidelink positioning reference signal based on the configuration of the initial sidelink positioning reference signal; transmitting, to the user equipment, a request for a transmission of a response sidelink positioning reference signal; receiving, from the user equipment, the response sidelink positioning reference signal based on a configuration of the response sidelink positioning reference signal; wherein the configuration of the response sidelink positioning reference signal is based at least partially on the configuration of the initial sidelink positioning reference signal; and estimating a position of the apparatus, based on the response sidelink positioning reference signal.

Example 41. A non-transitory program storage device readable by a machine, tangibly embodying a program of instructions executable by the machine for performing operations, the operations including: transmitting, to a user equipment, assistance information configured to be used with the user equipment to determine a configuration of an initial sidelink positioning reference signal; and transmitting, to the user equipment, an indication that a configuration of a response sidelink positioning reference signal transmitted by another user equipment in response to the initial sidelink positioning reference signal at least partially reuses the configuration of the initial sidelink positioning reference signal.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memories as described herein may be implemented using any suitable data storage technology, such as semiconductor based memory devices, flash memory, magnetic memory devices and systems, optical memory devices and systems, non-transitory memory, transitory memory, fixed memory and removable memory. The memories may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memories that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

It should be understood that the foregoing description is only illustrative. Various alternatives and modifications may be devised by those skilled in the art. For example, features recited in the various dependent claims could be combined with each other in any suitable combination(s). In addition, features from different example embodiments described above could be selectively combined into a new example embodiment. Accordingly, this description is intended to embrace all such alternatives, modifications and variances which fall within the scope of the appended claims.

The following acronyms and abbreviations that may be found in the specification and/or the drawing figures are given as follows (the abbreviations and acronyms may be appended with each other or with other characters using e.g. a dash, hyphen, slash, or number, and may be case insensitive):

| | |
|---|---|
| 3GPP | third generation partnership project |
| 4G | fourth generation |
| 5G | fifth generation |
| 5GC | 5G core network |
| AMF | access and mobility management function |
| ASIC | application-specific integrated circuit |
| BP | beam prediction |
| BW | bandwidth |
| CD | compact/computer disc |
| config | configuration |
| CPU | central processing unit |
| DL | downlink |
| DSP | digital signal processor |
| DVD | digital versatile disc |
| eNB | evolved Node B (e.g., an LTE base station) |
| EPC | evolved packet core |
| E-SMLC | evolved serving mobile location center |
| FPGA | field-programmable gate array |
| GMLC | gateway mobile location center |
| GNSS | global navigation satellite system |
| gNB | next generation node B, base station for 5G/NR, i.e., a node providing NR user plane and control plane protocol terminations towards the UE, and connected via the NG interface to the 5GC |
| I/F | interface |
| IIoT | industrial internet of things |
| IoT | internet of things |
| IMU | inertial measurement unit |
| INIT | initial |
| I/O | input/output |
| LMF | location management function |
| LTE | long term evolution (4G) |
| MME | mobility management entity |
| NF | network function |
| NG | new generation |
| NG-RAN | new generation radio access network |
| NR | new radio |
| NRF | network repository function |
| N/W | network |
| PC5 | direct communications interface |
| PRS | positioning reference signal |
| RAM | random access memory |
| RAN | radio access network |
| RAN# | RAN meeting |
| RAN1 | radio layer 1 |
| RESP | responding |
| ROM | read-only memory |
| RP | RAN plenary |
| RTT | round trip time |
| Rx | receiver or reception |
| S1 | interface connecting the eNB to the EPC |
| SCI | sidelink control information |
| SGW | serving gateway |
| S(I)NR | signal to interference and noise ratio |
| SL | sidelink |
| SMF | session management function |
| SON | self-organizing/optimizing network |
| TDOA | time difference of arrival |
| TR | technical report |
| TRP | transmission reception point |

-continued

| | |
|---|---|
| TS | technical specification |
| Tx | transmitter or transmission |
| UDM | unified data management |
| UDR | unified data repository |
| UE | user equipment (e.g., a wireless, typically mobile device) |
| UI | user interface |
| UPF | user plane function |
| USB | universal serial bus |
| V2X | vehicle-to-everything |
| VUR | vulnerable road user |
| Wi-Fi | wireless networking protocol that devices use to communicate without direct cable connections |
| X2 | network interface between RAN nodes and between RAN and the core network |
| Xn | network interface between NG-RAN nodes |

What is claimed is:

1. An apparatus comprising:

at least one processor; and at least one memory storing instructions that, when executed by the at least one processor, cause the apparatus at least to:

receive, from a user equipment, a request for a transmission of a response sidelink positioning reference signal, wherein the request for the transmission of the response sidelink positioning reference signal is based on lower layer signaling supporting sidelink control information associated with sidelink positioning reference signal transmission;

receive, from the user equipment, an initial sidelink positioning reference signal;

determine a configuration of the response sidelink positioning reference signal, based on a configuration of the initial sidelink positioning reference signal, wherein a parameter of the configuration of the response sidelink positioning reference signal and parameters of the configuration of the initial sidelink positioning reference signal relate to: bandwidth, comb size, and a number of symbols, wherein the determining comprises:

based on the apparatus not knowing a desired configuration for sidelink positioning reference signal that supports a positioning of the user equipment, select a configuration of a configured sidelink positioning reference signal from multiple configurations of respective multiple configured sidelink positioning reference signals based on the selected configuration of the configured sidelink positioning reference signal including the following: each of the parameters of the configuration of the initial sidelink positioning reference signal, and each of the parameters in the selected configuration of the configured sidelink positioning reference signals have values that are equal to or are greater than corresponding parameters in the configuration of the initial sidelink positioning reference signal, and each of the parameters in the selected configuration of the configured sidelink positioning reference signals have values that are equal to or are greater than respective parameters associated with a respective configuration of another configured sidelink positioning reference signal of the respective multiple configured sidelink positioning reference signals;

determine the configuration of the response sidelink positioning reference signal to comprise the selected configuration of the configured sidelink positioning reference signal; and transmit, to the user equipment, the response sidelink positioning reference signal.

2. The apparatus of claim 1, wherein the instructions, when executed by the at least one processor, cause the apparatus at least to:

determine the configuration of the response sidelink positioning reference signal to at least partially reuse the configuration of the initial sidelink positioning reference signal.

3. The apparatus of claim 2, wherein the instructions, when executed by the at least one processor, cause the apparatus at least to:

receive, from a location management function or a server user equipment, the configured sidelink positioning reference signal.

4. The apparatus of claim 3, wherein the instructions, when executed by the at least one processor, cause the apparatus at least to:

determine the configuration of the response sidelink positioning reference signal further based on a mapping between a mapped configuration of the initial sidelink positioning reference signal and a respective mapped configuration of another response sidelink positioning reference signal.

5. The apparatus of claim 4, wherein the instructions, when executed by the at least one processor, cause the apparatus at least to:

receive the at least one mapping from a location management function or a server user equipment.

6. The apparatus of claim 5, wherein the instructions, when executed by the at least one processor, cause the apparatus at least to:

receive, from the user equipment, a request to transmit another response sidelink positioning reference signal based on another configuration of the another response sidelink positioning reference signal, when a third parameter of the configuration of the response sidelink positioning reference signal does not meet at least one expectation, wherein the at least one expectation comprises a bandwidth of the configuration of the response sidelink positioning reference signal being smaller than a bandwidth of the configuration of the initial sidelink positioning reference signal.

7. The apparatus of claim 6, wherein the lower layer signaling comprises sidelink control information or the initial sidelink positioning reference signal.

8. A system comprising:

an apparatus:

at least one processor; and at least one memory storing instructions that, when executed by the at least one processor, cause the apparatus at least to:

receive, from a user equipment, a request for a transmission of a response sidelink positioning reference signal, wherein the request for the transmission of the response sidelink positioning reference signal is based on lower layer signaling supporting sidelink control information associated with sidelink positioning reference signal transmission;

receive, from the user equipment, an initial sidelink positioning reference signal;

determine a configuration of the response sidelink positioning reference signal, based on a configuration of the initial sidelink positioning reference signal, wherein a parameter of the configuration of the response sidelink positioning reference signal and parameters of the configuration of the initial sidelink positioning reference signal relate to: bandwidth, comb size, and a number of symbols, wherein the determining comprises:

based on the apparatus not knowing a desired configuration for sidelink positioning reference signal that supports a positioning of the user equipment, select a configuration of a configured sidelink positioning reference signal from multiple configurations of respective multiple configured sidelink positioning reference signals based on the selected configuration of the configured sidelink positioning reference signal including the following: each of the parameters of the configuration of the initial sidelink positioning reference signal, and each of the parameters in the selected configuration of the configured sidelink positioning reference signals have values that are equal to or are greater than corresponding parameters in the configuration of the initial sidelink positioning reference signal, and each of the parameters in the selected configuration of the configured sidelink positioning reference signals have values that are equal to or are greater than respective parameters associated with a respective configuration of another configured sidelink positioning reference signal of the respective multiple configured sidelink positioning reference signals;

determine the configuration of the response sidelink positioning reference signal to comprise the selected configuration of the configured sidelink positioning reference signal; and transmit, to the user equipment, the response sidelink positioning reference signal.

9. The system of claim 8, wherein the instructions, when executed by the at least one processor, cause the apparatus at least to:

determine the configuration of the response sidelink positioning reference signal to at least partially reuse the configuration of the initial sidelink positioning reference signal.

10. The system of claim 9, wherein the instructions, when executed by the at least one processor, cause the apparatus at least to:

receive, from a location management function or a server user equipment, the configured sidelink positioning reference signal.

11. The system of claim 10, wherein the instructions, when executed by the at least one processor, cause the apparatus at least to:

determine the configuration of the response sidelink positioning reference signal further based on a mapping between a mapped configuration of the initial sidelink positioning reference signal and a respective mapped configuration of another response sidelink positioning reference signal.

12. The system of claim 11, wherein the instructions, when executed by the at least one processor, cause the apparatus at least to:

receive the at least one mapping from a location management function or a server user equipment.

13. The system of claim 12, wherein the instructions, when executed by the at least one processor, cause the apparatus at least to:

receive, from the user equipment, a request to transmit another response sidelink positioning reference signal based on another configuration of the another response sidelink positioning reference signal, when a third parameter of the configuration of the response sidelink positioning reference signal does not meet at least one expectation, wherein the at least one expectation comprises a bandwidth of the configuration of the response sidelink positioning reference signal being smaller than a bandwidth of the configuration of the initial sidelink positioning reference signal.

14. The system of claim 13, wherein the lower layer signaling comprises sidelink control information or the initial sidelink positioning reference signal.

15. A method comprising:

receiving, by an anchor device from a user equipment, a request for a transmission of a response sidelink positioning reference signal, wherein the request for the transmission of the response sidelink positioning reference signal is based on lower layer signaling supporting sidelink control information associated with sidelink positioning reference signal transmission;

receiving, from the user equipment, an initial sidelink positioning reference signal;

determining a configuration of the response sidelink positioning reference signal, based on a configuration of the initial sidelink positioning reference signal, wherein a parameter of the configuration of the response sidelink positioning reference signal and parameters of the configuration of the initial sidelink positioning reference signal relate to: bandwidth, comb size, and a number of symbols, wherein the determining comprises:

based on the anchor device not knowing a desired configuration for sidelink positioning reference signal that supports a positioning of the user equipment, selecting a configuration of a configured sidelink positioning reference signal from multiple configurations of respective multiple configured sidelink positioning reference signals based on the selected configuration of the configured sidelink positioning reference signal including the following: each of the parameters of the configuration of the initial sidelink positioning reference signal, and each of the parameters in the selected configuration of the configured sidelink positioning reference signals have values that are equal to or are greater than corresponding parameters in the configuration of the initial sidelink positioning reference signal, and each of the parameters in the selected configuration of the configured sidelink positioning reference signals have values that are equal to or are greater than respective parameters associated with a respective configuration of another configured sidelink positioning reference signal of the respective multiple configured sidelink positioning reference signals;

determining the configuration of the response sidelink positioning reference signal to comprise the selected configuration of the configured sidelink positioning reference signal; and transmitting, to the user equipment, the response sidelink positioning reference signal.

16. The method of claim 15, further comprising: determining the configuration of the response sidelink positioning reference signal to at least partially reuse the configuration of the initial sidelink positioning reference signal.

17. The method of claim 16, further comprising: receiving, from a location management function or a server user equipment, the configured sidelink positioning reference signal.

18. The method of claim 17, further comprising: determining the configuration of the response sidelink positioning reference signal further based on a mapping between a mapped configuration of the initial sidelink positioning reference signal and a respective mapped configuration of another response sidelink positioning reference signal.

19. The method of claim 18, further comprising: receiving the at least one mapping from a location management function or a server user equipment.

20. The method of claim 19, further comprising: receiving, from the user equipment, a request to transmit another response sidelink positioning reference signal based on another configuration of the another response sidelink positioning reference signal, when a third parameter of the configuration of the response sidelink positioning reference signal does not meet at least one expectation, wherein the at least one expectation comprises a bandwidth of the configuration of the response sidelink positioning reference signal being smaller than a bandwidth of the configuration of the initial sidelink positioning reference signal.

* * * * *